T. C. FAWCETT.
Automatic Rain-Water Cut-Off.
No. 162,366.  Patented April 20, 1875.
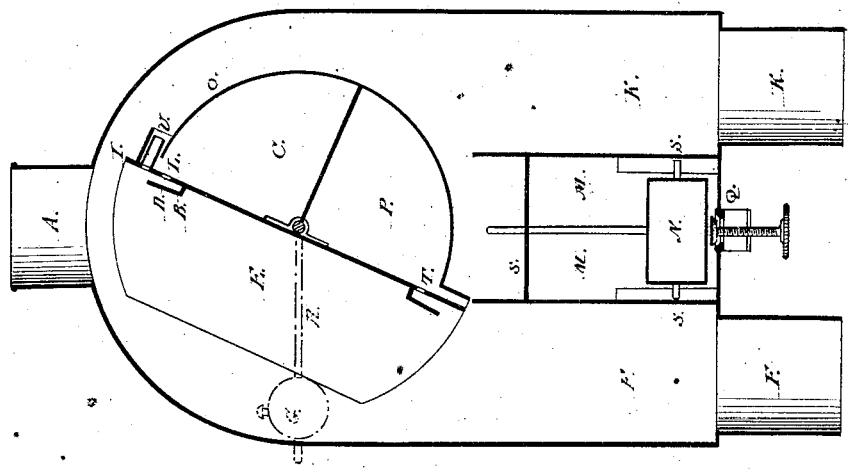
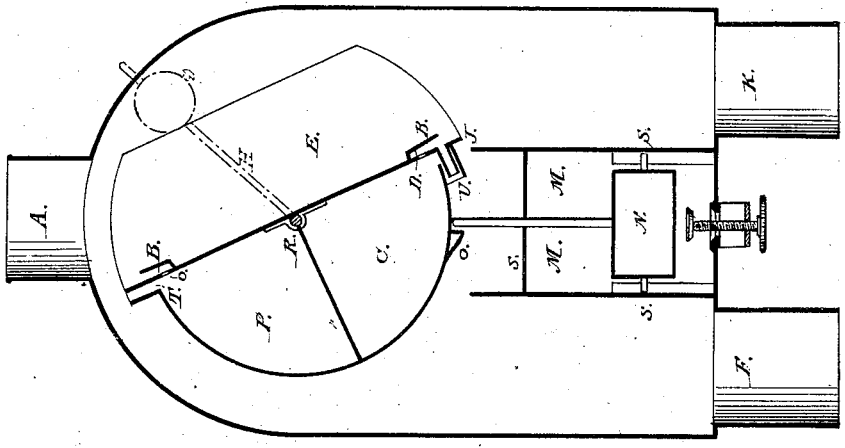

United States Patent Office.

THOMAS C. FAWCETT, OF ST. CLAIRSVILLE, OHIO.

IMPROVEMENT IN AUTOMATIC RAIN-WATER CUT-OFFS.

Specification forming part of Letters Patent No. 162,366, dated April 20, 1875; application filed February 2, 1875.

*To all whom it may concern:*

Be it known that I, T. C. FAWCETT, of St. Clairsville, in the county of Belmont and State of Ohio, have made a certain new and useful Improved Automatic Rain-Water Cut-Off; and I do hereby declare that the following is a full and true description thereof, reference being had to the accompanying drawings and to the letters of reference marked thereon.

It is well known that rain-water from the water-spouts of buildings is collected in cisterns, reservoirs, and the like, for household purposes; also, that the first supply or fall of water is impure, contaminated, and unfit for use, owing to the deposit of dirt, dust, soot, and other like matter which collects on the roofs and in the troughs or water-spouts. This invention consists in such a peculiar construction of the water cut-off proper, and the float, that the same is rendered self-acting, so that the first fall or supply of rain-water (which is contaminated and impure, as aforesaid) is allowed free escape out of the waste-pipe. By the time this is accomplished—the time being regulated by the adjustable weight—a sufficient supply has been caught on its passage through the waste-pipe to reverse, by its weight, the current of water to the pipe leading to cistern or other receptacle of clear water.

Figure 1.—The water from the main spout or conductor enters by tube A. A small portion is caught by the bucket B, enters cup C through the orifice D, while the main part is passing through the revoluble trough E into the waste-pipe F. The adjustable weight G holds the trough E, and consequently cup C, in position until the weight of water in cup C becomes greater than the adjustable weight G. Then the cup C, the trough E, and the rod H, to which the adjustable weight G is attached, are reversed (they being permanently attached to each other) until the trough at I is brought to the point J, Fig. II, thus changing the flow of water from the waste-pipe F to the clear-water pipe K, at which time the water in cup C, Fig. II, flows through the orifice L into the chamber M, raising the float N, the stem of which engages with the projection O, as seen in Fig. II, and locks the trough E in fixed position. The cup P in Fig. II then fills in the same as did cup C in Fig. I. After the water ceases to run, the water in chamber M escapes by valve Q, allowing the float N to drop, thus releasing the trough E at point O. The cup P now being full, and the cup C empty, the trough E is changed back to the waste-pipe F, as in Fig. I. The length of time the water should be in running through the waste-pipe F is regulated by adjusting the weight G on the rod H at different distances from the axle R. The length of time for resetting is regulated by opening and closing the valve Q. S S S are guides to keep the float N in position. The small tube U keeps the chamber M full of water while the water is flowing.

Having thus fully described my said invention, what I claim is—

1. An improved rain-water cut-off, provided with revoluble trough, cups, an adjustable weight, float, and water-chamber, by which the cut-off proper is rendered self-operating, substantially as and for the purpose set forth.

2. A revoluble trough E, constructed as described and provided with cups C and P, the adjustable weight G, and brackets B B, combined to operate substantially as and for the purposes set forth.

3. In combination with the projection O of a revoluble trough, the float N, arranged in chamber M, as described, to operate substantially as and for the purposes set forth.

T. C. FAWCETT.

Witnesses:
JOHN A. GROVE,
C. M. RHODES.